United States Patent [19]
Bel Hamri

[11] 3,748,867

[45] July 31, 1973

[54] APPARATUS TO OBTAIN FRESH WATER FROM MOISTURE CONTAINING AIR

[76] Inventor: Bernard Andre Bel Hamri, Immeuble l'Horizon, Ave. Delafosse, Abidjan - PB: 675, Ivory Coast

[22] Filed: Jan. 26, 1972

[21] Appl. No.: 220,869

[30] Foreign Application Priority Data
Nov. 10, 1971  France ............................. 7140226
Nov. 22, 1971  France ............................. 7141644

[52] U.S. Cl. ............... 62/271, 202/185 B, 203/11, 239/14
[51] Int. Cl. ............................................ F25d 23/00
[58] Field of Search ............... 203/11; 202/185 B; 239/2, 14; 62/268, 176, 271

[56] References Cited
UNITED STATES PATENTS

| 3,489,072 | 1/1970 | Secor ..................................... 98/58 |
| 3,135,466 | 2/1964 | Reid ..................................... 239/2 X |
| 3,450,602 | 6/1969 | James ..................................... 203/11 |
| 3,126,155 | 3/1964 | Lohse ..................................... 239/14 |
| 2,776,167 | 1/1957 | Koch ..................................... 239/14 X |

Primary Examiner—Meyer Perlin
Assistant Examiner—Ronald C. Capossela
Attorney—Robert D. Flynn, Stephen H. Frishauf et al.

[57] ABSTRACT

An elongated flexible tube has its upper end attached to a lighter-than-air balloon, preferably in the form of a non-rigid air ship (blimp), the length of the tube being sufficiently great to extend from about ground level to a temperature zone having a climatic condition in which the temperature or moisture distribution of the atmosphere is sufficiently different from that at ground level to permit, either, condensation of moisture as moisture-containing atmosphere is conducted upwardly into the tube or introduction of seed crystals, such as silver iodide, into the atmosphere to cause precipitation. In the first case, the tube is preferably terminated at its lower end at an opening spaced a short distance above a large body of water, such as an ocean, and maintained on floats or pontoons located in the sub-tropical or tropical regions, moisture-laden air from the ocean being drawn into the tube so that the water only will condense on the tube walls, at the upper atmospheric reaches thereof, to be drawn off and collected. In the second case, when seed crystals are to be introduced, the tube is preferably mounted on an automotive vehicle for wide dispersion of seed crystals.

9 Claims, 4 Drawing Figures

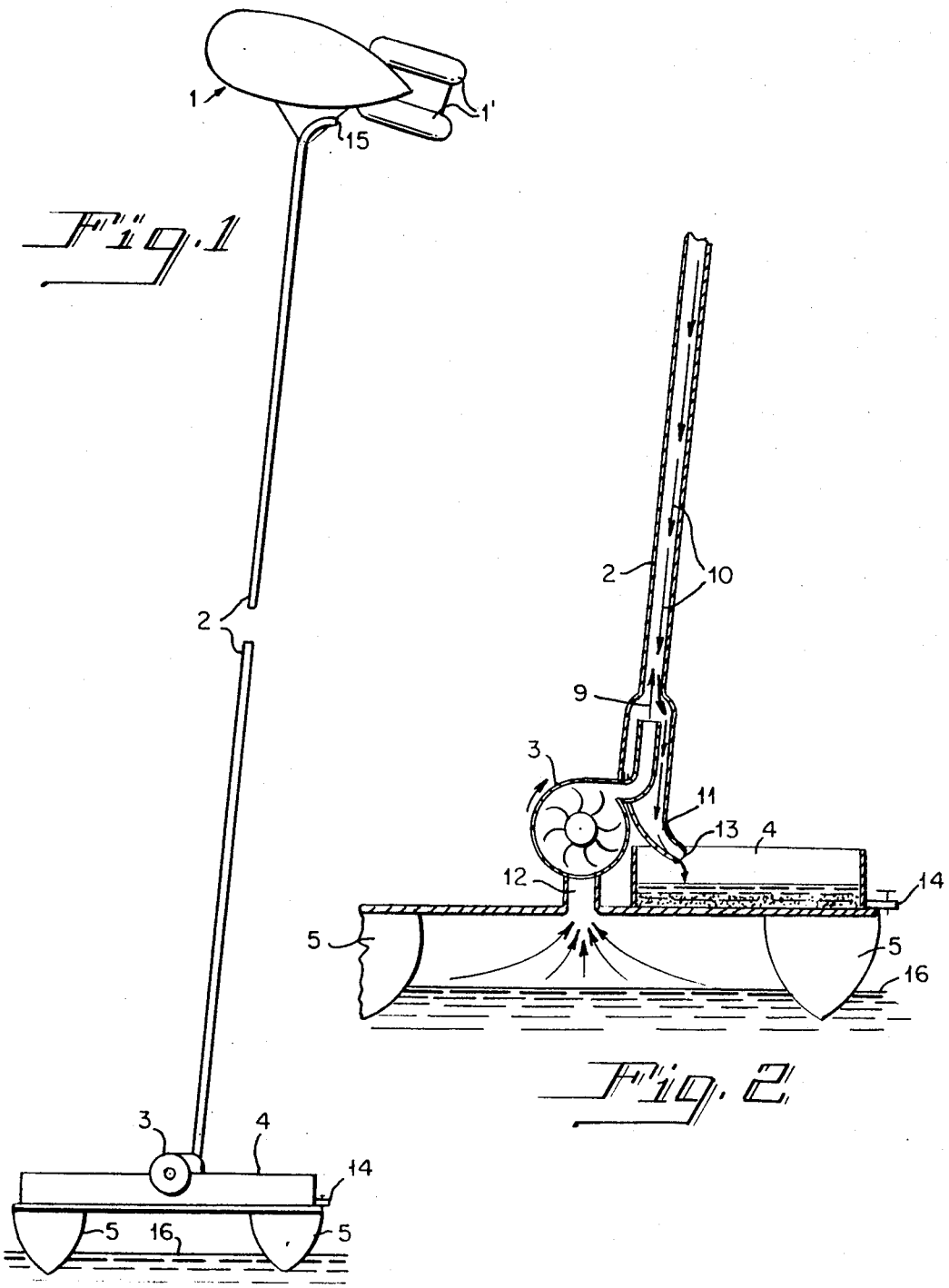

PATENTED JUL 31 1973
SHEET 2 OF 2
3,748,867
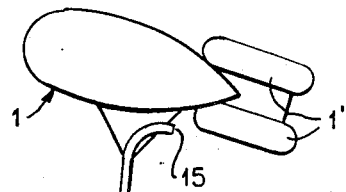
Fig.3
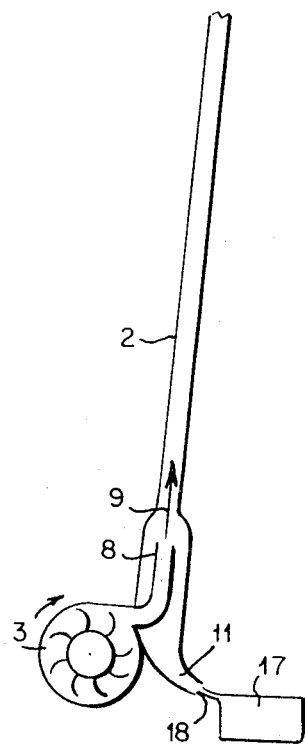
Fig.4
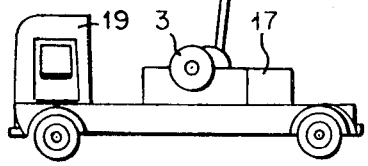

APPARATUS TO OBTAIN FRESH WATER FROM MOISTURE CONTAINING AIR

The present invention relates to apparatus to extract fresh water from salt water, or from clouds in hot climates, and more particularly to generate fresh water in dry climatic zones which are adjacent large bodies of water, such as the ocean.

It has previously been proposed to utilize sea water and, by various processes of desalinization, to extract fresh water which can be used in human or animal consumption, or for agriculture. Most of these processes utilize evaporation and distillation techniques. Other processes include steps in which the water is frozen, the ice being essentially salt-free so that, when the ice is again melted, fresh water is obtained. Most of these processes have disadvantages in that the residual salts are difficult to eliminate, cause trouble with the apparatus, and substantially raise the price of the fresh water which is produced so that the cost of the fresh water quickly reaches a prohibitive level. Additionally, the installation costs of the apparatus and machinery is high so that generation of fresh water from saline sea water is restricted to few and selected installations.

It is an object of the present invention to provide an apparatus to obtain fresh water from moisture laden air which does not require complicated apparatus, and in which such devices and apparatus as are necessary are inexpensive, readily mobile, and do not require special installations nor auxiliary or support apparatus of high technology.

SUBJECT MATTER OF THE PRESENT INVENTION

Briefly, moisture-laden air is introduced into an elongated flexible tube, having its bottom opening at, or close to ground level and supported, for example by pontoons or the like, above a body of water such as the ocean. The top of the tube is held at great altitude, elevated by a balloon or the like which is lighter than air, such as a non-rigid air ship. At sufficient altitudes, the temperature at the upper end of the tube will be much colder than that at the surface of the sea. Moisture-laden air, from the sea surface is sucked into the tube by fans or blowers, or the like. Only little power is necessary in order to introduce moisture-laden air, for example from the bottom of a tarpaulin, or the like of sufficient extent, for example of hundred square meters, or more, into the bottom of the tube. The air, saturated with water vapor is drawn upwardly along the length of the tube until it arrives at a height where the outside climatic conditions are such that the temperature is sufficiently low and the water in suspension can condense naturally along the walls of the tube, to fall downwardly along the inner tube walls into a reservoir provided on the pontoons to hold the fresh water. Saline residues are practically eliminated since the water vapor above sea level contains but little salt, and the water which is received in the reservoir is fresh water with hardly any mineral or saline content.

In climatic zones where large bodies of water are not present, for example at the interior of deserts, but where from time to time moisture-laden air, that is, clouds pass by, the same apparatus, with minor modifications, can be used to extract the fresh water not from a body of water at ground level, but rather, from a body of moisture vapor in the air. Cloud seeding crystals are introduced into the tube at the bottom, the upper level of the tube being held by the balloon or the like at cloud level, so that the cloud seeding crystals can be introduced directly into the cloud to cause fresh water, that is, moisture to precipitate and fall in the form of rain. Costs for aircraft for cloud seeding, and the like, are therefore eliminated. The tube itself can be mounted on a vehicle, such as a truck, for mobility and for passage beneath the cloud formation to increase the extent of cloud seeding possible, and thus the recuperation of moisture from the atmosphere.

The invention will be described by way of example with reference to the accompanying drawings, wherein:

FIG. 1 is a general schematic view illustrating the application of the invention to extract moisture from water vapor existing just above the surface of the ocean;

FIG. 2 is a fragmentary, schematic view, to a different scale, illustrating details of the apparatus;

FIG. 3 is a view of the apparatus as applied to cloud seeding, mounted on a vehicle;

and FIG. 4 is a fragmentary schematic view illustrating portions of the apparatus of FIG. 3.

The apparatus of FIGS. 1 and 2 comprises a blimp, or non-rigid air ship 1 having wind-responsive rudders 1' at the rear end thereof, so that the blimp will turn towards the wind. The air ship itself is located at the upper end of a flexible tube 2, having its opening directed towards the rear of the blimp 1. The blimp and the tube can be formed, at the upper end, as a single molded plastic or rubberized structure, or connected or attached to each other by any means well known in the art; additional attachment cables or guy wires can be used, and have been left off from the drawing for simplicity.

The upper opening of the flexible tube 2, directed towards the rear portion 15 of the blimp 1 has the effect that winds blowing against the blimp will have the tendency to establish a vacuum at the aft end of the blimp with respect to its forward nose, and thus to provide suction at the exit opening of tube 2. The lower end of tube 2 has an injection tube 8 for moisture-laden air therein (FIG. 2). Injection element 8 is connected to the outlet of a blower or fan 3 which has an inlet 12 capable of taking in moisture-laden air, located close to the surface of the ocean 16, at a location at which evaporation of water is intense. The moisture saturated air is directed by blower 3 upwardly, in direction of arrow 9, and passes through the interior of the tube towards the top opening thereof. As the moisture-saturated air reaches an altitude which is sufficiently high so that the outside temperature becomes sufficiently less than the temperature at the surface of the ocean 16, the moisture in suspension in the vapors being conducted up the tube will condense at the inner walls of the tube 2 in order to fall back under gravity as seen by arrows 10. The condensed liquid from the inner walls of the tube is caught in a recovery vessel 14, attached to a hollow inlet tube 11. Outlet valve 14 from recovery vessel 4 can then be used to tap off fresh water.

In order to prevent obstruction of tube 2 by condensed water, as indicated by arrows 10, and to prevent decrease of air flow injected by the blower apparatus 3, a flap valve 13 is provided at the lower opening of the tube 11. The flap valve, and the blower 3 are alternately cyclically operated, for example by a timer or cycling apparatus (not shown, and well known in the art). Upward introduction of moisture-laden air is carried out during a first phase during which valve 13 is closed. This prevents dry air, or air not taken directly from above the ocean surface to be introduced through tube 11 into tube 2. In a second phase, the blower 3 is stopped for a time sufficiently great to permit condensed water to run down the inside walls of the tube 2, while valve 13 is open.

The apparatus is sustained on pontoons 5, located on a suitable framework. The top of the framework is covered, for example by tarpaulin or other essentially airtight covering 6. The airtight covering 6 is maintained a short distance above sea level.

The lateral extent of the non-pervious covering 6, on pontoons 5 may be a hundred square meters or more; the eventual size will depend on the flexibility of the framework in the light of wave action, storms and the like to be expected. The greater the surface covered by the covering 6, the greater the inflow of moisture-containing air into tube 2 and thus the greater the recovery of fresh water.

The apparatus has the advantage that it can be located at any place, where desired, along the shore. Preferably, winching apparatus or the like (not shown) to control the air ship 1 is also installed on the pontoons, together with guy and support cables. The water caught in reservoir 4 is completely free of saline residue, or any other contamination which may have been present in the ocean water itself. The energy of sunlight, and ambient temperature is utilized to effect evaporation of the water, and cooling of the moisture-containing air is carried out by making use of naturally occurring temperature differences, so that no additional power requirements for operation of the apparatus during water recovery are needed. Since the water obtained is taken from moisture-containing air, the water in reservoir 4 will have practically the characteristics of distilled water.

The apparatus as described can be located not only on the ocean, but also on other large bodies of water, located in climatic zones where evaporation of water occurs at a high rate.

The vapor contained in the air close to the ocean can be condensed in the form of droplets; there are two requirements in order to obtain condensation: air which is saturated, and presence of condensation cores or surfaces.

The effect of saturation and condensation is usually obtained by cooling of the air; air which is cooled can be saturated with a moisture quantity which is less than that when the air is hot. For example, one cubic meter of air which contains 11 g of water vapor at a temperature of 25° C is not saturated; a quantity of 11 g of water vapor in 1 m³ will saturate at 10° C. Thus, by cooling, condensation of the water can be obtained and the water recuperated.

Natural spontaneous evaporation of free air is most active when the surface of the liquid is great; the temperature of the liquid to be evaporated, as well as the surrounding air temperature is high; the air is substantially dry; and the air is not frequently renewed — in other words, there is little wind. These conditions are present in many arid and dry countries bordering oceans; if sufficient air flow and difference in temperature due to the length of tube 2 can be obtained, then the additional blower 3 need provide but little output, or may even be completely unnecessary. It is, however, desirable to have a substantially great volume of air pass through tube 2.

The length of the tube 2 depends on the climatic and environmental conditions and may, typically, rise to 3000 m, or more, that is, to a region in which the temperature has dropped sufficiently for condensation of moisture. It is known that, on the average, a temperature drop of 6.5°C per 1000 meters is usual. Air, therefore, under rapid cooling will saturate at a given altitude, and water vapor contained in the air will condense in the form of droplets which will fall down to ground level under their own weight. These droplets may thus run down at the inner walls of the tube, for collection in recovery vessel 4, or they may fall down separately in the form of rain.

Fresh water can be obtained not only from water vapor contained in air closely adjacent a surface of a body of water, such as closely above the ocean, but also from clouds, by utilizing the apparatus to introduce a large quantity of cloud seeding crystals into a cloud. Such cloud seeding is well known, and usually utilizes silver iodide crystals, in fine dispersions, introduced into cloud masses.

The modification of the apparatus merely requires substitution of the collection vessel 4, for fresh water, by an injection element 17 through which silver iodide crystals are introduced into tube 2, to be blown upwardly by blower 3. Rather than mounting the structure on pontoons, for support over a body of water, the apparatus is now mounted on a truck 19, or other vehicular, movable support, such as railway rolling stock. The silver iodide reservoir 17 has an injection nozzle 18 which extends into tube 11. The output of the nozzle 18 can be controlled, by controlling the nozzle. Upon operation of the blower, silver iodide will be atomized and injected, upwardly through the tube, into clouds at high altitude, to which the upper end of the tube has been brought by movement of vehicle 19. The blimp 1 is controlled in the same manner as before, for example by additional guy wires or cables (not shown) and injection of the atomized silver iodide crystals again is downstream with respect to the aerodynamic shape of blimp 1. The entire apparatus is lightweight, easy to handle, and can be placed or relocated as desired; for extensive cloud seeding, the vehicle 19 can be moved over the ground surface during the seeding; for longer displacement, over greater distances, tube 2 can be hauled in an blimp 1 collapsed, the total volume of the blimp and the tube being easily storable on vehicle 19 itself. Other crystals than silver iodide can be used although silver iodide crystals have been found effective in this field, in order to obtain rain water from clouds. Great volumes of cloud masses can be seeded in short time intervals, diffusion of the seed material being facilitated and indeed ensured by bending the outlet of tube 2 towards the aft of blimp 1.

The apparatus may thus be used in various applications without essential modification; in one application, to have the upper end of the flexible tube 2 introduced into clouds for cloud seeding, and on the other, to have the lower end of the tube placed close to a source of moisture-laden air, such as above ocean surfaces, the apparatus itself remaining essentially unchanged but being merely mounted on different supports, above ground or above water.

The tube 2 can be of various materials, for example matching that of the blimp 1; or it may be of fiberglass, nylon, other man-made fabrics, rubberized or plasticized to provide an essentially water and air impervious enclosure having, however, sufficient light weight to be readily carried by blimp 1. Stiffening rings, or the like, may be located at intervals along the tube 2 to prevent collapse of the tube under wind stresses. The tube 2 can be essentially cylindrical, or slightly conical, tapering upwardly and can be somewhat ridged, at least internally, or formed with beads to facilitate condensation of moisture on the inside of the tube.

Various changes and modifications may be made within the inventive concept. I claim:

1. Apparatus to obtain fresh water from moisture-containing air comprising
   an elongated flexible tube;
   lighter-than-air balloon means attached to the upper end of the elongated tube, the lower end of the tube being located at essentially ground level, the length of the tube being sufficient to extend from a temperature zone, at ground level, to a zone of climatic conditions including termperature or moisture distribution in the air which is different from the climatic conditions at ground level and where the temperature is less than at ground level;
   the balloon means having sufficient lift to hold the tube extended from ground level to said zone having lesser temperature;
   means generating an updraft in the tube;
   and means in fluid communication with the tube to collect water condensing at the side walls of the tube and running along the tube walls, by gravity.

2. Apparatus according to claim 1, wherein the lower end of the tube is located above a body of water;
   means are provided funnelling moisture-laden air from above the surface of the body of water into the lower end of the tube, the tube being of sufficient length to reach to a height at which the ambient temperature outside of the tube is sufficient for condensation of moisture of the air in the tube at the sidewalls of the tube.

3. Apparatus according to claim 2, including float means supporting the lower end of the tube above the water;
   and said means funnelling the air into the tube comprising directing baffle means spaced from above the surface of the body of water and having means extending into said tube to direct moisture-laden air into the inlet of the tube.

4. Apparatus according to claim 3, wherein the air directing baffles comprise sheet-like flexible materials; pontoons are provided supporting said sheet-like flexible material above the surface of the ocean.

5. Apparatus according to claim 4, wherein the area of said sheet-like material is at least in the order of 100 $m^2$.

6. Apparatus according to claim 2, including forced air circulation means introducing moisture-laden air from above the surface of the body of water into the tube and blowing the air upwardly therein.

7. Apparatus according to claim 6, including valve means in said tube selectively effecting connection at the lower end of the tube, cyclically, with
   1. said forced air circulation means to draw moisture-laden air into the tube and circulate it upwardly thereof; and
   2. the condensate collection means, said forced air circulation means being stopped during at least part of the cycle during which the valve establishes communication with the condensate collection means.

8. Apparatus according to claim 1, wherein the lighter-than-air balloon means are in streamlined form;
   and the upper end of the tube is arranged on the lighter-than-air balloon means in such a manner that winds blowing against the balloon means create a partial vacuum adjacent the upper end of the tube to assist in causing a draft within the tube.

9. Apparatus according to claim 1, wherein the length of the tube is in the order of several thousands of meters.

* * * * *